United States Patent
Chermon et al.

(10) Patent No.: US 11,665,726 B2
(45) Date of Patent: *May 30, 2023

(54) REMOTE SLOWING OR STOPPING A PROGRESS OF A DRONE TOWARDS A TARGET

(71) Applicant: D-FEND SOLUTIONS AD LTD., Raanana (IL)

(72) Inventors: Assaf Monsa Chermon, Kfar Yedida (IL); Nadav Arie, Tel Aviv (IL); Hanan Leizerovich, Petach Tikva (IL); Ohad Moshe Abarbanel, Tel Aviv (IL)

(73) Assignee: D-FEND SOLUTIONS AD LTD., Raanana (IL)

(*) Notice: Subject to any disclaimer, the term of this patent is extended or adjusted under 35 U.S.C. 154(b) by 138 days.

This patent is subject to a terminal disclaimer.

(21) Appl. No.: 17/129,664

(22) Filed: Dec. 21, 2020

(65) Prior Publication Data
US 2021/0136779 A1 May 6, 2021

Related U.S. Application Data

(63) Continuation of application No. 16/946,472, filed on Jun. 23, 2020, now Pat. No. 11,395,306, which is a
(Continued)

(30) Foreign Application Priority Data

Jul. 22, 2018 (IL) .......................... 260726
Jul. 22, 2020 (IL) .......................... 276239

(51) Int. Cl.
*H04J 3/00* (2006.01)
*H04W 72/08* (2009.01)
(Continued)

(52) U.S. Cl.
CPC .......... *H04W 72/082* (2013.01); *H04B 7/265* (2013.01); *H04K 3/41* (2013.01);
(Continued)

(58) Field of Classification Search
CPC ............ H04W 72/082; H04W 72/0446; H04B 7/265; H04B 7/18504; H04B 7/212;
(Continued)

(56) References Cited

U.S. PATENT DOCUMENTS

| 4,103,236 A | 7/1978 | Desemo et al. |
| 9,416,302 B2 | 8/2016 | Salnikov et al. |

(Continued)

FOREIGN PATENT DOCUMENTS

| CN | 106788873 A | 5/2017 |
| CN | 107656543 A | 2/2018 |

(Continued)

OTHER PUBLICATIONS

Grover et al. "Jamming and Anti-Jamming Techniques in Wireless Networks: A Survey." International Journal of Ad Hoc and Ubiquitous Computing, 17(4): 197-215, Dec. 2014.
(Continued)

*Primary Examiner* — Chuong T Ho
(74) *Attorney, Agent, or Firm* — Reches Patents (57) ABSTRACT

Systems, and method and computer readable media that store instructions for slowing or stopping a progress, towards a target, of a drone controlled by a remote control unit.

15 Claims, 7 Drawing Sheets

Related U.S. Application Data continuation of application No. 16/513,769, filed on Jul. 17, 2019, now Pat. No. 10,728,906.

(51) Int. Cl.
| | |
|---|---|
| *H04B 7/26* | (2006.01) |
| *H04K 3/00* | (2006.01) |
| *H04L 5/00* | (2006.01) |
| *H04L 5/14* | (2006.01) |
| *H04W 72/0446* | (2023.01) |

(52) U.S. Cl.
CPC ............ *H04L 5/0007* (2013.01); *H04L 5/143* (2013.01); *H04W 72/0446* (2013.01)

(58) Field of Classification Search
CPC .......... H04K 3/41; H04K 3/42; H04L 5/0007; H04L 5/143; H04L 5/1469
USPC ........................................................ 370/280
See application file for complete search history.

(56) References Cited

U.S. PATENT DOCUMENTS

| | | | | |
|---|---|---|---|---|
| 10,044,465 | B1* | 8/2018 | Hetsko | G01S 19/215 |
| 10,496,953 | B1* | 12/2019 | Hahn | H04L 67/306 |
| 10,553,122 | B1* | 2/2020 | Gilboa-Amir | G08G 5/0091 |
| 10,728,906 | B2 | 7/2020 | Leizerovich et al. | |
| 2004/0235508 | A1 | 11/2004 | Uchida | |
| 2009/0237289 | A1 | 9/2009 | Stoddard | |
| 2010/0103892 | A1 | 4/2010 | Abrahamsson et al. | |
| 2010/0151808 | A1 | 6/2010 | Toncich et al. | |
| 2011/0065390 | A1 | 3/2011 | Asplund et al. | |
| 2011/0300888 | A1 | 12/2011 | Sakumoto | |
| 2012/0163335 | A1 | 6/2012 | Chung et al. | |
| 2012/0264388 | A1 | 10/2012 | Guo et al. | |
| 2013/0003674 | A1 | 1/2013 | Lin et al. | |
| 2013/0163482 | A1 | 6/2013 | Suzuki et al. | |
| 2013/0171975 | A1* | 7/2013 | Lindner | H04L 65/1083 |
| | | | | 455/412.1 |
| 2013/0301484 | A1 | 11/2013 | Khandani | |
| 2013/0308940 | A1 | 11/2013 | Kpodzo et al. | |
| 2014/0172193 | A1* | 6/2014 | Levien | G08G 5/0082 |
| | | | | 701/2 |
| 2014/0206343 | A1 | 7/2014 | Immendorf et al. | |
| 2014/0219449 | A1 | 8/2014 | Shattil et al. | |
| 2015/0139422 | A1 | 5/2015 | Jover | |
| 2016/0036674 | A1 | 2/2016 | Tanaka | |
| 2016/0259062 | A1 | 9/2016 | Raghupathy et al. | |
| 2017/0238234 | A1* | 8/2017 | Dowlatkhah | G07C 5/008 |
| | | | | 455/517 |
| 2017/0301248 | A1* | 10/2017 | Silverman | G08G 5/045 |
| 2018/0041956 | A1 | 2/2018 | Abraham et al. | |
| 2018/0150073 | A1* | 5/2018 | Lee | B64D 45/00 |
| 2018/0295560 | A1 | 10/2018 | Hodge | |
| 2019/0039728 | A1* | 2/2019 | Hutson | B64C 39/024 |
| 2019/0116609 | A1 | 4/2019 | Feng et al. | |
| 2019/0180542 | A1 | 6/2019 | Geier et al. | |
| 2019/0342775 | A1* | 11/2019 | Christopherson | H04W 16/10 |
| 2019/0363821 | A1* | 11/2019 | Whittaker | G05D 1/0022 |
| 2020/0236602 | A1* | 7/2020 | Mahkonen | H04W 36/0083 |
| 2020/0364456 | A1* | 11/2020 | Tran | B64C 39/024 |
| 2020/0374889 | A1* | 11/2020 | Kalhan | H04W 36/00837 |
| 2021/0185568 | A1* | 6/2021 | Chang | H04W 36/04 |
| 2022/0111960 | A1* | 4/2022 | Tran | B64D 1/18 |

FOREIGN PATENT DOCUMENTS

| | | |
|---|---|---|
| JP | 2004015412 A | 1/2004 |
| JP | 5647540 B2 | 12/2014 |
| WO | 1993022850 A1 | 11/1993 |
| WO | 1993026124 A1 | 12/1993 |
| WO | 2020021529 A1 | 1/2020 |

OTHER PUBLICATIONS

Karlsson et al., "Jamming a TDD Point-to-Point Link Using Reciprocity-Based MIMO," IEEE Transactions on InformationForensics and Security, 12(12): 2957-2970, Published Online Jul. 11, 2017.

Mietzner et al., "Responsive Communications Jamming Against Radio-Controlled Improvised Explosive Devices," IEEECommunications Magazine, 50(10): 38-46, Oct. 1, 2012.

Parlin "Jamming of Spread Spectrum Communications Used in UAV Remote Control Systems," Master's Thesis, Tallinn University of Technology, School of Information Technologies, Thomas Johann Seebeck Department of Electronics, Estonia, p. 1-57, May 17, 2017.

* cited by examiner

REMOTE SLOWING OR STOPPING A PROGRESS OF A DRONE TOWARDS A TARGET

CROSS REFERENCE

This application is a continuation in part of U.S. patent application Ser. No. 16/946,472 filing date Jun. 23, 2020. U.S. patent application Ser. No. 16/946,472 is a continuation of U.S. patent application Ser. No. 16/513,769 filing date Jul. 17, 2019, now U.S. Pat. No. 10,728,906 grant date Jul. 28, 2020. U.S. patent application Ser. No. 16/513,769 claims priority from Israeli Patent application 260726 filing date Jul. 22, 2018. All patents and patent applications being incorporated herein by their entirety.

This application claims priority from Israeli patent application 276239 filing date Jul. 22, 2020 which is incorporated herein by their entirety.

BACKGROUND

The popularity of commercial drones is growing rapidly. By year 2020, over one hundred million drones are expected to be in use. Until a few years ago, Unmanned Aerial Vehicles (UAV) were purely military aircrafts. Today, commercial drones are widely available, relatively inexpensive, and feature top-notch military-grade capabilities.

While most drones are used for legitimate and positive purposes, many are used irresponsibly or maliciously—risking aircrafts in airports, smuggling drugs and weapons into prisons, attacking or harassing political figures, and carrying-out terror acts.

Military counter-drone technologies, usually based on radar detection, narrow beam RF jamming, or kinetic mitigation (missiles, destructive laser beams) have been deployed successfully in offshore military installations and rural environments.

However, in various scenarios (even in military scenarios) these technologies are not suitable. For example—these technologies may not be suitable for urban environments or airports due to various risks, including but not limited to collateral damage.

There is a growing need to provide an efficient method for securing a target with minimal collateral damage.

SUMMARY

There may be provided systems, methods, and computer readable medium as illustrated in the specification.

There may be provided a method for slowing or stopping a progress, towards a target, of a drone controlled by a remote control unit, the method may include: transmitting, using a transmitter, disruption signals for introducing communication errors between the drone and the remote control unit during multiple spaced apart miscommunication periods thereby inducing the drone to slow or stop a progress of the drone towards the target and perform multiple communication amendment attempts without executing, by the drone, a failsafe plan. The stopping or slowing may include reducing the progress rate—for example reducing the average progress rate to the target—so that even some movement towards the target is allowed—as long that the average progress rate is reduced—and even zeroed.

The introducing of the communication errors may include disconnecting the drone from the remote control unit and wherein the multiple communication amendments attempts are reconnection attempts.

The transmitting may include transmitting the disruption signals during multiple spaced apart transmission periods that at least partially overlap at least two miscommunication periods of the multiple spaced apart miscommunication periods.

The duration of each transmission period may not exceed a timing threshold that corresponds to an estimated duration of a disconnection period that triggers an execution, by the drone, of the failsafe plan.

The miscommunication pattern formed by the multiple spaced apart miscommunication periods differs from an estimated miscommunication pattern that triggers an execution, by the drone, of the failsafe plan.

The method may include verifying that the drone performed a reconnection attempt following a transmission of disruption signals during a miscommunication period of the multiple space apart miscommunication periods.

The method may include monitoring responses of at least one of the drone and the remote control unit to a transmission of at least some of the disruption signals.

The method may include adapting the transmitting of the disruption signals based on the responses of the at least one of the drone and the remote control unit to the transmission of at least some of the disruption signals.

The method may include determining a location of at least one of the drone and the remote control unit during the multiple spaced apart miscommunication periods and between the multiple spaced apart miscommunication periods.

The method may include transmitting the disruption signals during multiple spaced apart transmission periods, wherein disruption signals transmitted during at least two of the multiple spaced apart transmission periods differ from each other.

The method may include monitoring at least one of the remote control unit, and the drone to provide monitoring results; wherein the transmitting is responsive to the monitoring results.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be provided a method, a system, and a computer readable medium for stopping of slowing an access of a drone to a target.

Disruption signals may be transmitted towards a drone and may cause the drone to experience multiple spaced apart communication errors that may cause the drone to slow its progress to the target and/or halt.

The disruption signals may be defined to cause communication errors between the drone and the remote control unit but may be narrow enough not to interfere with other communication links in the area of the drone. Thus—blocking of wide frequency ranges may not be implemented.

Some drones, when disconnected from a remote control unit, may halt or stop their progress towards a target until successfully reconnected. Once reconnected—or shortly after—additional disruptions signals are transmitted and the drone may be disconnected again—and may perform yet another reconnection attempt.

Drones may respond to different events in different manners.

A first event may occur when the drone is disconnected from a remote control unit for a first period of time.

A second event may occur when the drone is disconnected for a second period of time.

The communication between the drone and the remote control unit may be disconnected from time to time and it is expected that not any miscommunication will trigger the execution of the failsafe plan.

Accordingly—it is expected that the second period of time will exceed the first period of time.

Following a first event—the drone should reconnect and the reconnecting may require more than successfully receiving only a fraction of the normal communication rate to stop the counting of the second period of time.

The drone may respond to the first event by trying to reconnect to the remote control unit. The response may include, for example, stop transmitting, start transmitting in a pre-set frequency, start transmitting very short messages that contain only reconnect parameters, reduce the transmission rate, transmit at another frequency or another frequency band, change encoding scheme, stop or slow down frequency hopping, change frequency table for frequency hopping, reduce or increase bandwidth of transmission, stop transmission and restart after a set period of time, stop transmission and restart while transmitting new auxiliary keys that would re-seed communication parameters, transmit a fixed pre-set message in order to re-sync with the remote control unit, alter any other transmission parameter and the like. The remote control unit, when detecting that the drone disconnected may perform the same steps.

The reconnection may be detected by a receiver, and once detected the reconnection may require changing one or more parameters of the disruption signals. The changing may be followed by generating disruption signals that may be transmitted during the reconnection or only after a successful completion of s reconnection.

According to an embodiment, the disruption signals may be generated regardless of the detection of the reconnection attempts.

According to an embodiment, and assuming that the change of one or more transmission parameter may be not be detected—the transmitter may transmit (even concurrently or in close proximity) disruption signals that may disrupt communication in different scenarios—such as (i) the communication between the drone and the remote control unit changed following the first event—and (ii) the communication between the drone and the remote control unit was not changed following the first event. The drone may slow its progress and even halt as response to the first event.

The drone may respond to the second event by initiating a failsafe plan. This may involve propagating towards a predefined landing spot (may be the location from which the drone took off—or may be another location—for example the current location of the drone), hovering in place (at least until the battery of the drone is drained), and/or performing additional communication responses. The additional communication responses may be similar to the communication responses to the first event or may be more severe than the communication responses to the first event). The drone may activate an auxiliary device that may be attached to it, such as an explosive device, as a part of the failsafe plan or following an execution of the failsafe plan.

The drone may respond to a third event—a successful reconnection. The third event may occur following a response to the first event and/or following the response to the second event.

A success in the reconnection attempt (when the reconnection attempt was triggered by the first event) may be followed by proceeding with the behavior that preceded the disconnection—for example returning to normal behavior.

A success in the reconnection attempt (when the reconnection attempt was triggered by the second event) may be followed by proceeding with the failsafe plan.

An execution of the failsafe plan may be terminated by the remote control unit.

The communication between the drone and the remote control unit may be a time division duplex (TDD) communication, any other time division multiple communication, code division multiple access communication, frequency division multiplexing communication, and the like. For simplicity of explanation some examples will refer to TDD communication.

Figure 1:
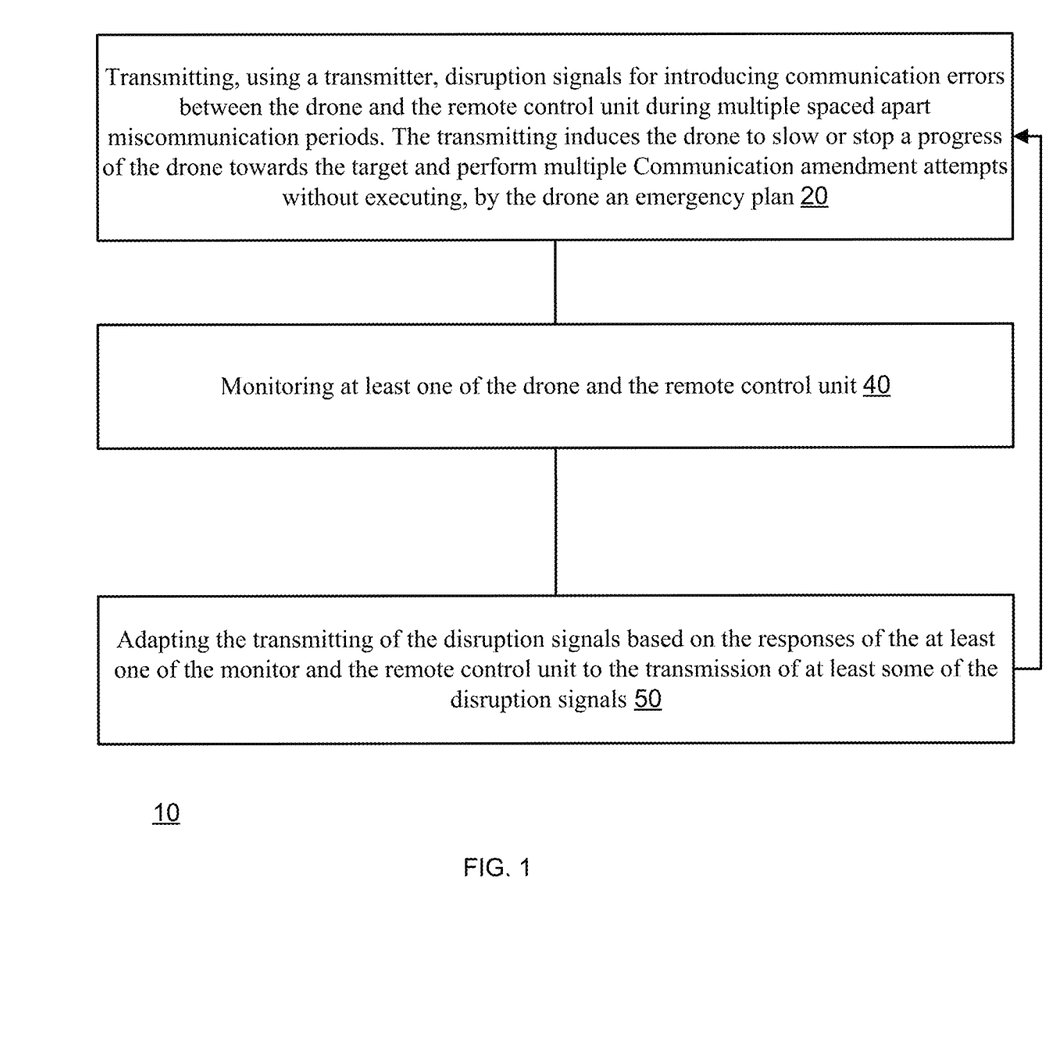
FIG. 1 illustrates an example of a method.

FIG. 1 illustrates an example of method 10.

Method 10 may start by step 20 of transmitting, using a transmitter, disruption signals for introducing communication errors between the drone and the remote control unit during multiple spaced apart miscommunication periods. The time gap between the spaced apart miscommunication periods may allow the drone to successfully recover from the miscommunication periods.

The transmitting induces the drone to slow or stop a progress of the drone towards the target and perform multiple communication amendment attempts without executing, by the drone, a failsafe plan. This may prevent the drone from executing a failsafe plan that may include propagating towards a predefined landing spot (may be the location from which the drone took off—or may be another location—for example the current location of the drone), hovering in place (at least until the battery of the drone is drained), and/or performing additional communication responses The induced communication errors may involve disconnecting the drone from the remote control unit, and the multiple communication amendments attempts are reconnection attempts.

A non-limiting example of the transmission of disruption signals is illustrated in U.S. patent application Ser. No. 16/513,769 filing date Jul. 17, 2019 which is incorporated herein by reference. The disruption signals may differ from those illustrated in U.S. patent application Ser. No. 16/513,769.

The disruption signals may be spread over the entire spectrum of communication between the drone and the remote control unit, may spread over a part of said spectrum, may involve frequency hopping, scanning of said spectrum of a portion of the spectrum, follow the specific frequencies and time of transmission of the specific frequencies used by the drone and the remote control unit, may follow a frequency band and the time of transmissions of frequencies within the frequency bands used by the by the drone and the remote control unit, may be transmitted in a continuous manner during one or more miscommunication periods, may be transmitted only during one or more parts of one or more miscommunication periods, and the like.

The disruption signals may be determined in any manner—for example based on previous study of the communication between the drone and the remote control unit, based on on-the-fly learning of the communication between the drone and the remote control unit or a combination of predefined disruption signals that may be adapted overtime based on the success of the disruption signals to cause communication errors and the like.

Step 20 may include transmitting the disruption signals during multiple spaced apart transmission periods that at least partially overlap at least two miscommunication periods of the multiple spaced apart miscommunication periods. A transmission period may fully or partially overlap a corresponding miscommunication periods.

The time different between an end of one miscommunication period to a start of the next miscommunication period may be long enough to allow the drone to successfully complete a reconnection attempt.

The duration of each transmission period does not exceed a timing threshold that corresponds to an estimated duration of a disconnection period that triggers an execution, by the drone, of the failsafe plan.

A miscommunication pattern formed by the multiple spaced apart miscommunication periods (for example duration of miscommunication of each miscommunication period, and the time between adjacent miscommunication periods) differs from an estimated miscommunication pattern that triggers an execution, by the drone, of the failsafe plan.

Method 10 may include step 40 of monitoring at least one of the drone and the remote control unit.

Step 40 may be executed before the execution of step 10, in parallel to the execution of step 10, and following the execution of step 10.

For example—the transmission of any disruption signal may be followed by detecting the presence of a drone within a protected region.

The monitoring may include searching for communication between the drone and the remote control unit, detecting the drone (by a visual sensor or by any other type of sensor), monitoring telemetry data (like drone location, operator location, remote control location or other telemetry data), and the like.

Reception windows for monitoring the communication between the drone and the remote communication unit may be timed between miscommunication periods and/or during the miscommunication periods.

Step 40 may include, for example, monitoring responses of at least one of the drone and the remote control unit to a transmission of at least some of the disruption signals.

Step 40 may include verifying that the drone performed a reconnection attempt following a transmission of disruption signals during a miscommunication period of the multiple space apart miscommunication periods. The next miscommunication period may start following a verification that a successful reconnect attempt was completed by the drone.

Step 40 may be followed by step 50 of adapting the transmitting of the disruption signals based on the responses of the at least one of the drone and the remote control unit to the transmission of at least some of the disruption signals.

Step 40 may include determining a location of at least one of the drone and the remote control unit during the multiple spaced apart miscommunication periods and between the multiple spaced apart miscommunication periods.

The disruption signals transmitted during at least two of the multiple spaced apart transmission periods may differ from each other.

The disruption signals transmitted during at least two of the multiple spaced apart transmission periods may be the same.

Step 10 may be based, at least in part, on monitoring results generated during step 40.

Figure 2:
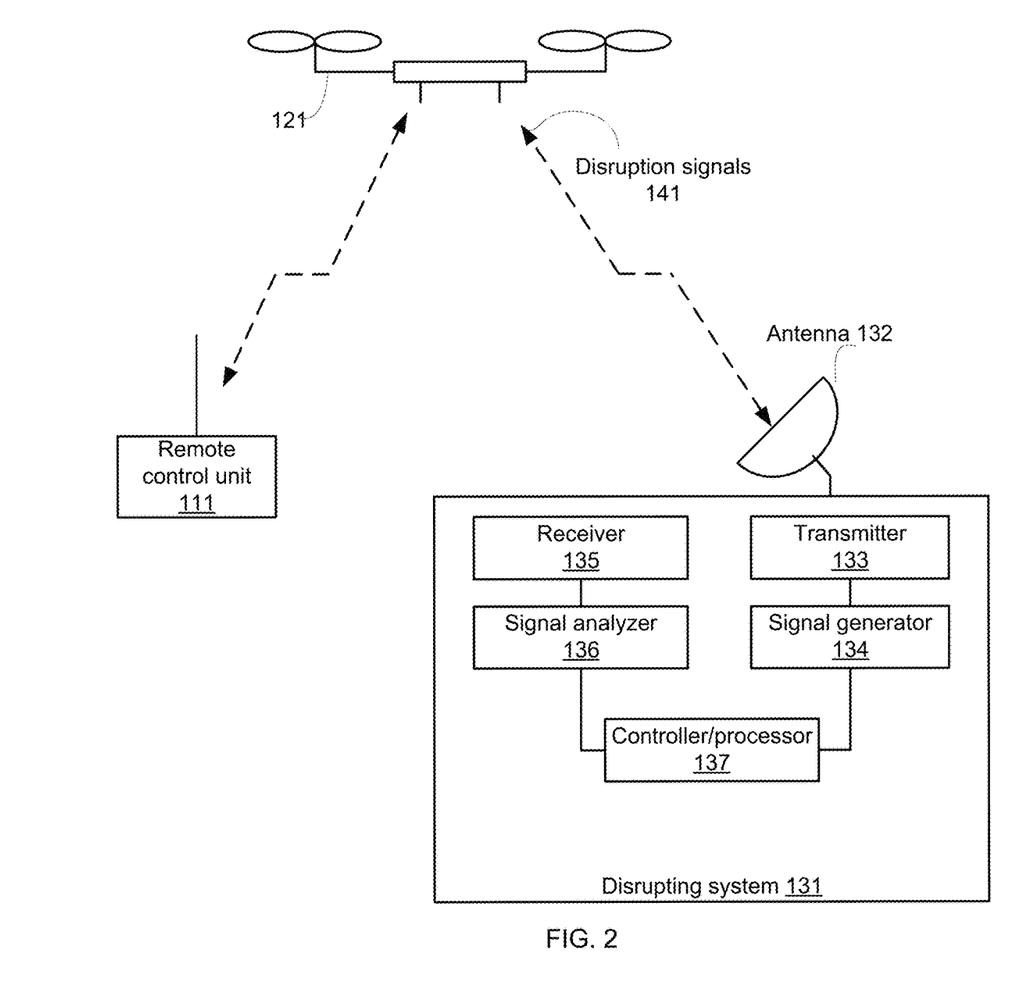
FIG. 2 illustrates an example of a disrupting system, a drone and a remote control unit.

FIG. 2 is an example of a disrupting system 131, a drone 121 and a remote control unit 111.

The drone 121 and the remote control unit 11 may communicate over a bi-directional link.

The disruption signals 141 are aimed to introduce communication errors between the drone 121 and the remote control unit 11 during multiple spaced apart miscommunication periods.

The disrupting system 131 is illustrated as including antenna 132, a transmitter 133, a signal generator 134, a receiver 135, a signal analyzer 136 and a controller/processor unit 137.

Antenna 132 may be used for receiving signals transmitted from drone 121 and/or from the remote control unit 111. These signals are sent to receiver 135 that provides detection signals to signal analyzer 136 that may analyze the signals. The analysis may be spectrum analysis, timing analysis, and the like. The signal generator 134 may generate the disruptive signals to be transmitted by transmitter 133 via antenna 132.

It should be noted that the disruption system may have one or more transmission antennas that are separate from one or more reception antennas, The disrupting system 131 may include only part of the units illustrated in figure and/or may include more or other units.

The controller/processor may be a controller and/or a processor. The controller may control the operation of the disrupting system and the processor may receive the analysis of received signals from signal analyzer 136 and determine which disrupting signals to transmit and when to transmit them.

The controller/processor may perform the functionality of the signal analyzer and/or of the signal generator 134.

The disrupting system 131 may be configured to execute method 10.

Figure 3:
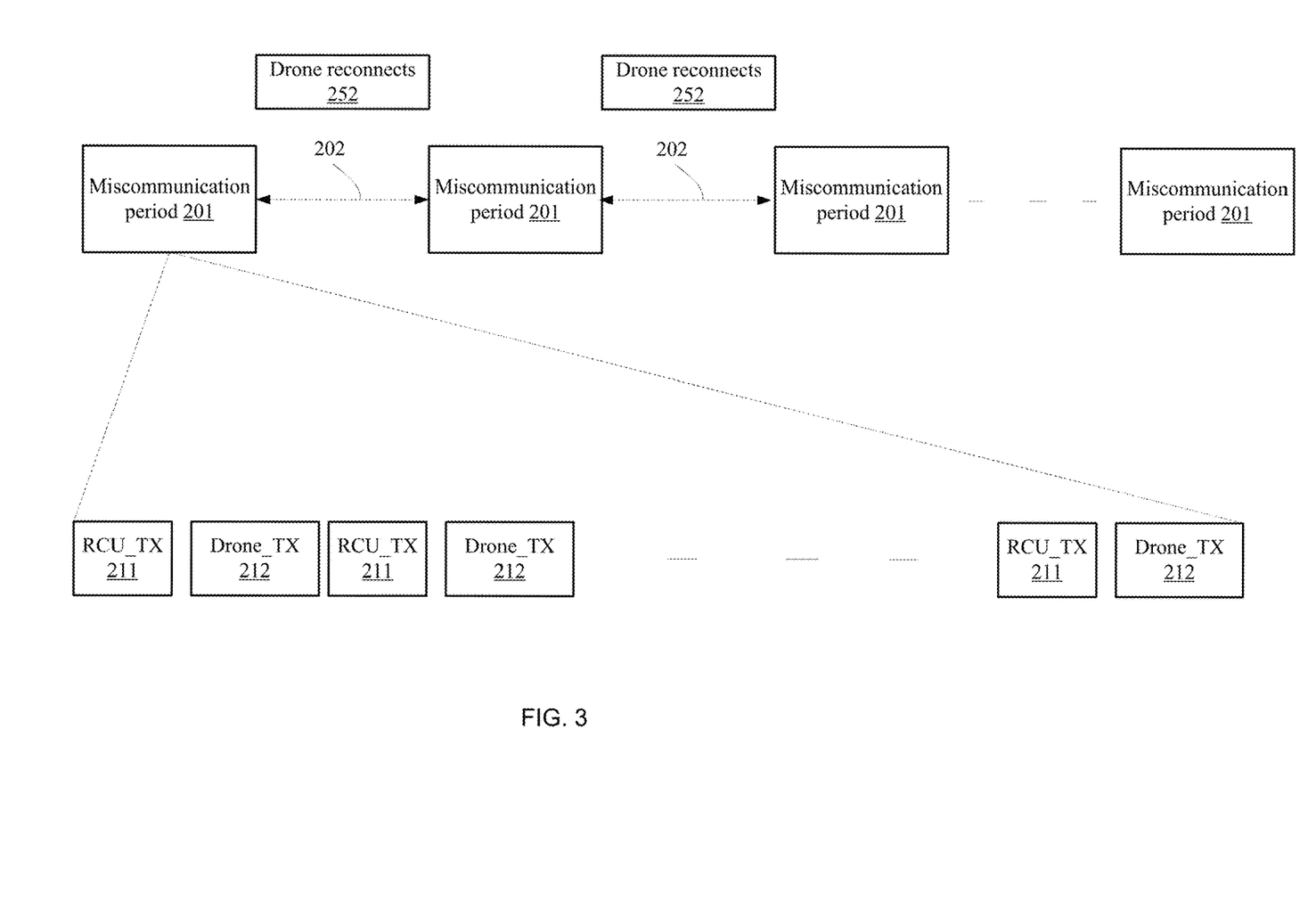
FIG. 3 illustrates an example of a timing diagram.
Figure 4:
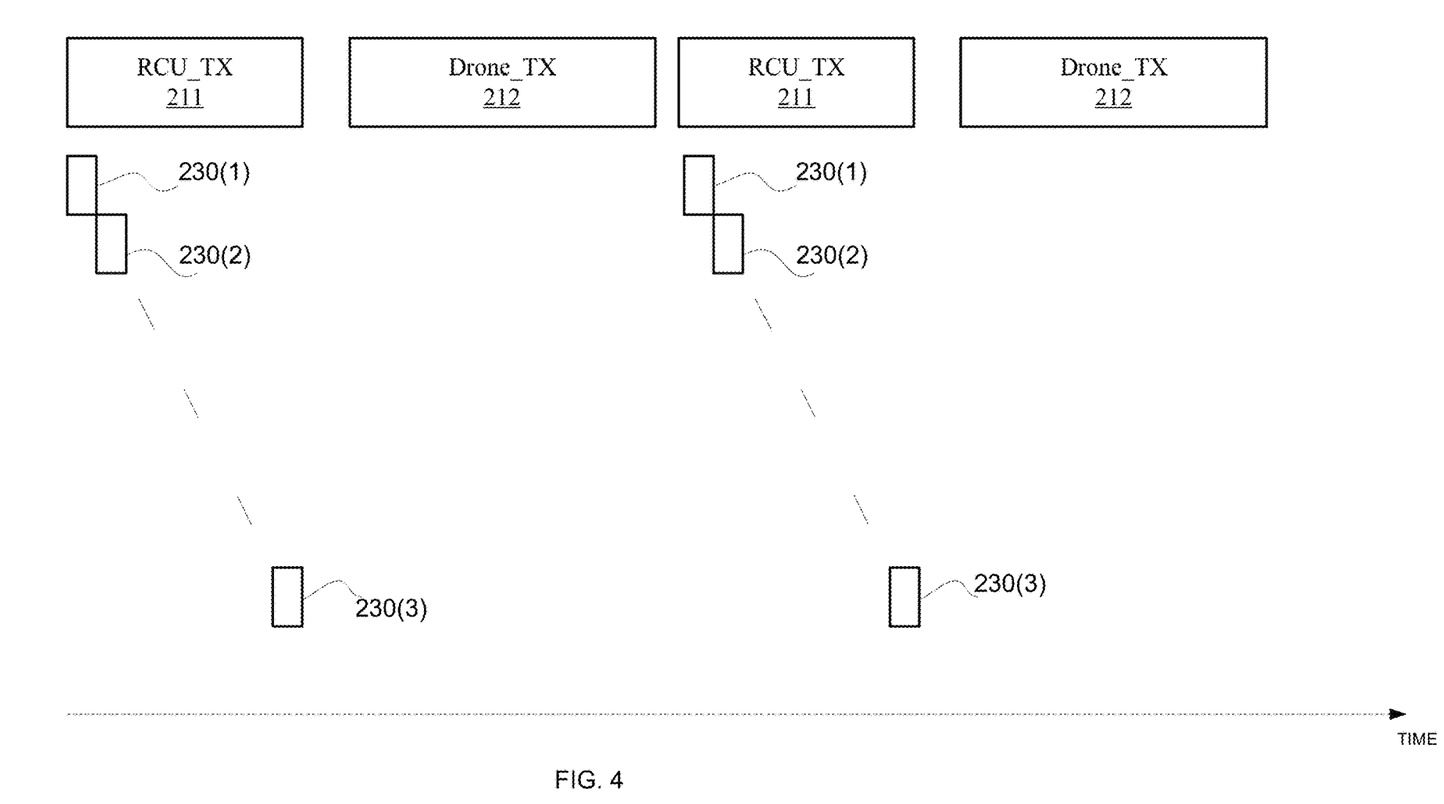
FIG. 4 illustrates an example of a timing diagram.

FIG. 3 and FIG. 4 illustrate examples of timing diagrams.

FIG. 3 illustrates multiple miscommunication periods 201 that are spaced apart from each other by time gaps 202 during which the drone may reconnect (252). Each miscommunication include multiple time windows—including multiple pairs of (a) a remote control unit transmission window (RCU_Tx) 211, and (b) drone transmission window (Drone_Tx) 212. The drone may open a reception window during RCU_TX. The remote control unit may open a reception window during Drone_TX.

The length of the disruption period and the time gap between consecutive disruption periods may depend on one or more parameters of a specific drone of interest and/or on one or more parameters of the communication protocol between the specific drone and the remote control unit. Examples of such parameters include the length of the first period of time, the length of the second period of time, length of a reconnection attempts, and the like.

For example—the disruption period and the time gap between consecutive disruption periods may be one or few seconds. When using TDD, the duration of a single remote control unit transmission window (RCU_Tx) is in the order of milliseconds (for example one milliseconds). Thus—the remote control unit may transmit hundreds and even thousands of times (during hundred and even thousands of RCU_TXs) during a single disruption period. The disruption signals may be transmitted during all or at least a significant number of the RCU_TXs. One or multiple disruption signals may be transmitted during a single RCU_TX.

For example—referring to FIG. 4 of the current application and to the example listed in FIG. 3A of U.S. patent application Ser. No. 16/513,769, multiple (N) disconnect signals (230(1)-230(N)) of N different frequencies (F1 . . . FN) may be transmitted during a single RCU_TX 211.

Figure 5:
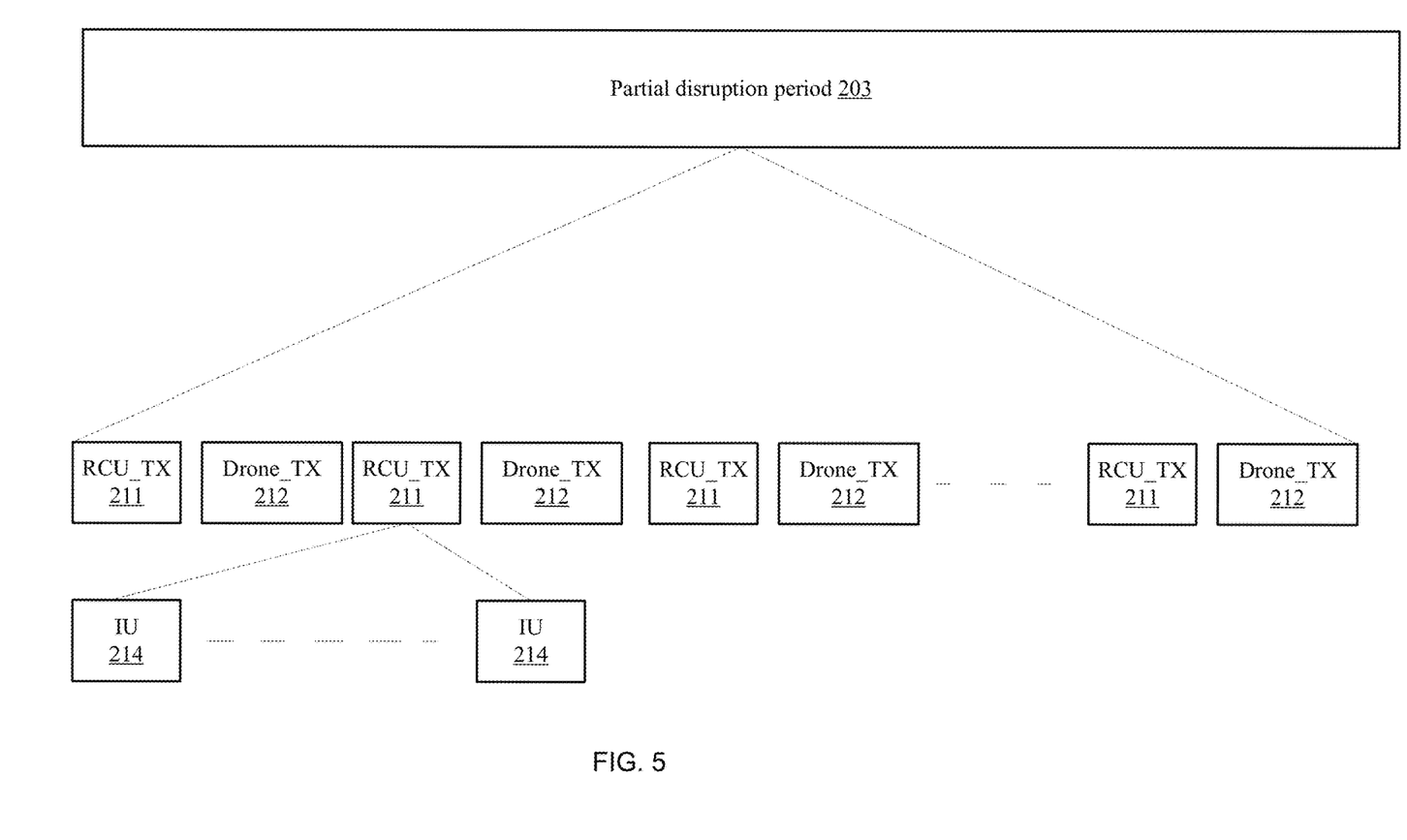
FIG. 5 illustrates an example of a timing diagram.

FIG. 5 is an example of timing diagram. The timing diagram illustrates multiple remote control unit transmission windows 211 and multiple drone transmission windows 212 transmitted during a partial disruption period 203. The timing diagram also illustrates multiple information units IUs 214 of a remote control unit transmission window. During the partial disruption period 203, the reception (or a combination of reception and successful decoding) of some but not all IUs of the remote control unit transmission windows is interfered with. In the usual case such partial disruption would not cause the drone to attempt to reconnect with the remote control unit, but in some cases the drone might attempt to amend the connection when such disruption occurs.

The duration of the partial disruption period 203 is long enough to include multiple (for example hundreds, thousands and even more) remote control unit transmission windows (RCU_Txs). The disruption signals may attempt to interfere with a reception of most (for example more than 50, 55, 60, 65, 70, 75, 80, 85, 90, and 95 percent) of the IUs. For example—the disruption may include attempting to mask most of the IUs transmitted during RCU_Tx windows, the masking may occur during the entirety or a majority of the RCU_Tx, and the like. For example—a majority of the IU of all the remote control unit transmission windows may be interfered with, only IUs of some of the remote control unit transmission windows may be interfered with, IUs of entire remote control unit transmission windows may be interfered with, IUs of some remote control unit transmission windows may interfered with, and the like.

The partial disruption period 203 may be of any duration. It may, for example, continue as long as the communication between the drone and the remote control unit should be interfered with, and the like.

When, for example, viewing few seconds during one or more partial disruption periods, then interference is applied in relation to only some of the information units while others are not interfered with.

For example—referring to FIGS. 4 and 5 of the current application—and to U.S. patent application Ser. No. 16/513,769—multiple (N) disruption signals (230(1)-230(N)) of N different frequencies (F1 . . . FN) may be transmitted during a majority of the control unit transmission windows (RCU_Txs) within partial disruption period 203.

Figure 6:
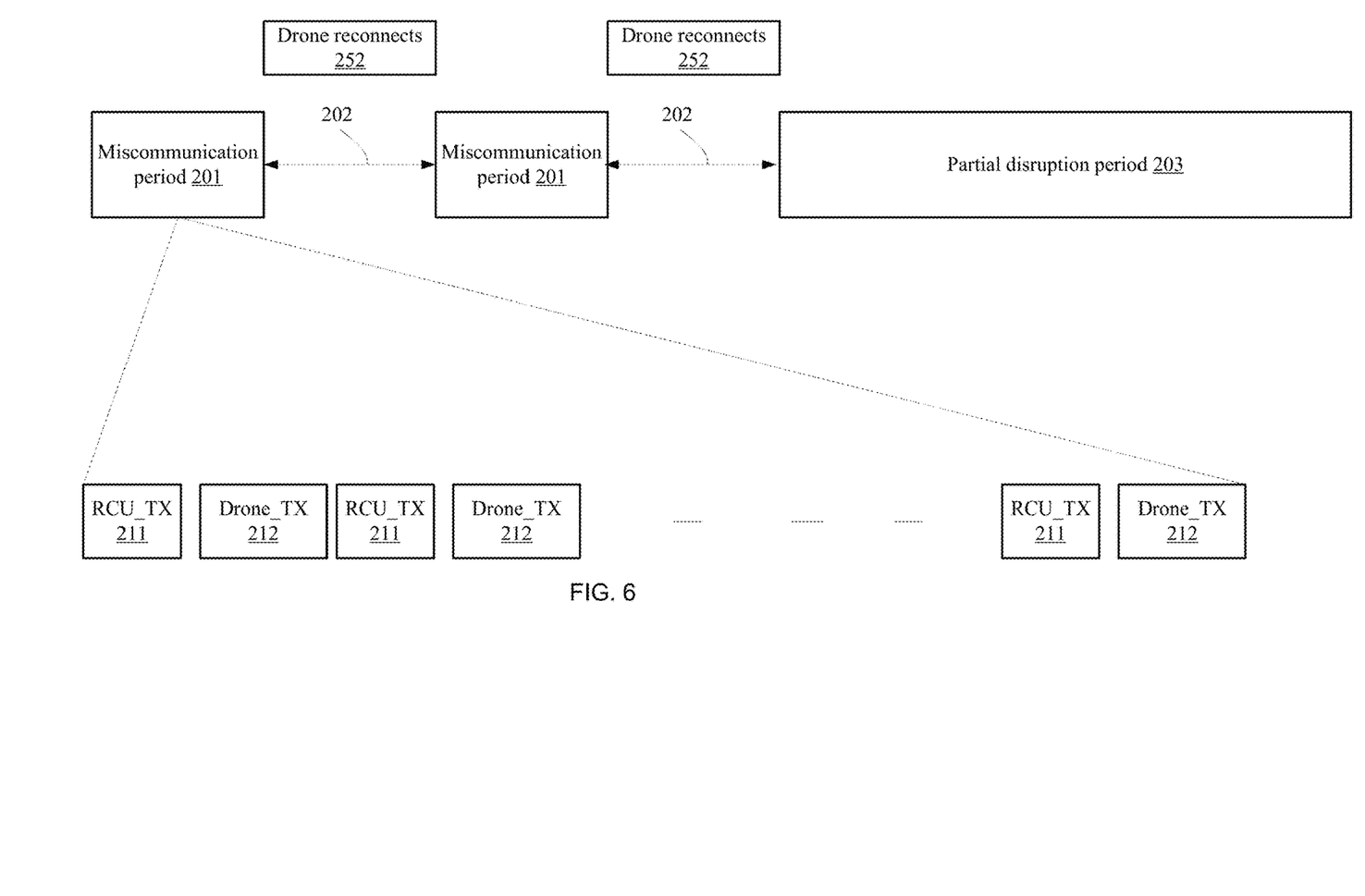
FIG. 6 illustrates an example of a timing diagram.

FIG. 6 is an example of a timing diagram that illustrates a combination of miscommunication periods 201 (followed by drone reconnect attempts) and a partial disruption period 203. The partial disruption period 203 may be of any duration. It may, for example, continue as long as the communication between the drone and the remote control unit should be interfered with, and the like.

Any combination of partial disruption periods 203 and miscommunication periods 201 (followed by drone reconnect attempts) may be provided. There may be any ratio between the number of miscommunication periods 201 (followed by drone reconnect attempts) and the number of partial disruption periods 203.

Decisions may be taken to switch between one or more partial disruption periods 203 and one or more miscommunication periods 201 (followed by drone reconnect attempts). The decisions may be predetermined. The decisions may be based on monitoring a behavior of the drone and/or the remote control unit. The decision may be random and/or pseudo/random, and the like.

Figure 7:
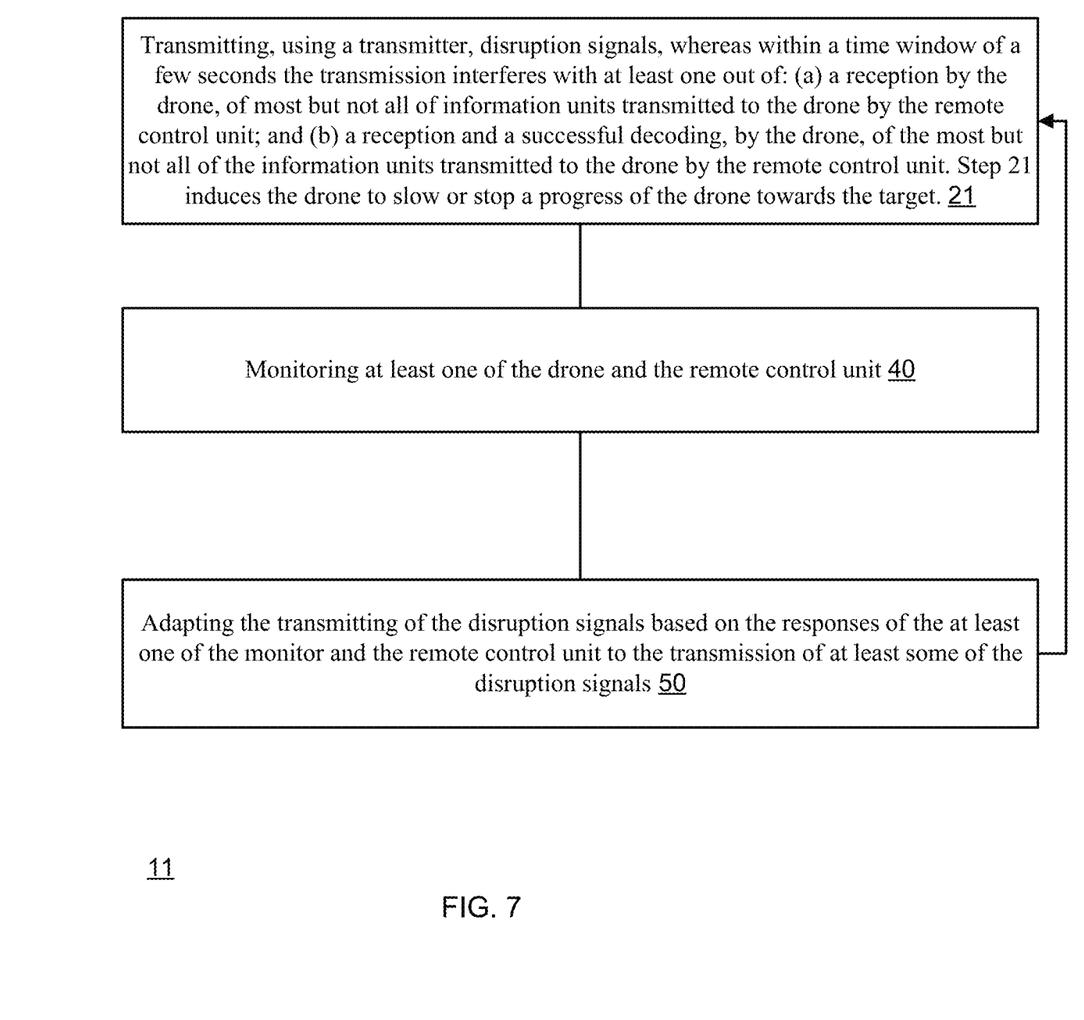
FIG. 7 illustrates an example of a method.

FIG. 7 illustrates an example of a method 11.

Method 11 is for slowing or stopping a progress, towards a target, of a drone controlled by a remote control unit.

Method 11 may start by step 21 of transmitting, using a transmitter, disruption signals, whereas within a time window of a few seconds the transmission interferes with at least one out of: (a) a reception by the drone, of most but not all of information units transmitted to drone by the remote control unit; and (b) a reception and a successful decoding, by the drone, of the most but not all of the information units transmitted to drone by the remote control unit. Step 21 induces the drone to slow or stop a progress of the drone towards the target.

Step 21 may include transmitting the disruption signals without inducing the drone to execute a failsafe plan of the drone.

In some cases the drone does not attempt to reconnect with the remote control unit following step 21. For example—applying step 21 does not amount to an occurrence of a first event that causes the drone to attempt to reconnect to the remote control unit. In normal conditions the drone may tolerate certain loss of signals from the remote control unit—for example due to changes in the locations of the drone—without disconnecting.

Step 21 may include transmitting the disruption signals for preventing a successful encoding of most but not all information units sent to the drone from the remote control unit.

Step 21 may include transmitting the disruption signals during multiple spaced apart transmission periods, wherein disruption signals transmitted during at least two of the multiple spaced apart transmission periods differ from each other.

Step 21 may be followed by step 40 of monitoring responses of at least one of the drone and the remote control unit to a transmission of at least some of the disruption signals.

Step 40 may include determining a location of at least one of the drone and the remote control unit during the multiple spaced apart miscommunication periods and between the multiple spaced apart miscommunication periods.

Step 40 may provide monitoring results and step 21 may be responsive to the monitoring results.

Step 40 may be followed by step 50 of adapting the transmitting of the disruption signals based on the responses of the at least one of the drone and the remote control unit to the transmission of at least some of the disruption signals.

It should be noted that any one of methods 10 and 11 may include determining at least one parameter of the disruption signals based on at least one parameters out of (a) the location of the drone and/or the remote control unit, (b) one or more spatial relationships between two or more out of the drone, the transmitter and the remote control unit, (c) expected reception of the remote control unit signals by the drone, and the like.

For example—if the drone enters an area that is characterized by communication disruptions then the transmission parameters may be adapted so as not to result in an occurrence of the second event (when applying method 10) or not to result in an occurrence of the first event (when applying method 11). For example—if a certain area imposes disconnections of a certain duration—then the duration of a miscommunication periods 201 may be smaller than the duration of miscommunication that triggers the second event minus the certain duration. It should be noted that the adaptation may also take into account the expected strength of the transmissions of the remote control unit.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more"

or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for slowing or stopping a progress, towards a target, of a drone controlled by a remote control unit, the method comprises:
    transmitting, using a transmitter, disruption signals, whereas within a time window of a few seconds the transmission interferes with at least one out of:
        (a) a reception by the drone, of most but not all of information units transmitted to drone by the remote control unit; and
        (b) a reception and a successful decoding, by the drone, of the most but not all of the information units transmitted to drone by the remote control unit;
    thereby inducing the drone to slow or stop a progress of the drone towards the target; and
    determining a location of at least one of the drone and the remote control unit during the multiple spaced apart miscommunication periods and between the multiple spaced apart miscommunication periods.

2. The method according to claim 1 wherein the transmitting do not induce the drone to execute a failsafe plan of the drone.

3. The method according to claim 1, comprises transmitting the disruption signals for preventing the reception and the successful decoding of the most but not all of the information units sent to the drone from the remote control unit.

4. The method according to claim 1, comprises transmitting the disruption signals for allowing only a certain percentage of information units transmitted over a few seconds to be successfully decoded by the drone.

5. The method according to claim 1 comprising monitoring responses of at least one of the drone and the remote control unit to a transmission of at least some of the disruption signals.

6. The method according to claim 5 comprising adapting the transmitting of the disruption signals based on the responses of the at least one of the drone and the remote control unit to the transmission of at least some of the disruption signals.

7. The method according to claim 1 wherein the transmitting comprises transmitting the disruption signals during multiple spaced apart transmission periods, wherein disruption signals transmitted during at least two of the multiple spaced apart transmission periods differ from each other, wherein the multiple spaced apart transmission periods at least partially overlap at least two miscommunication periods of the multiple spaced apart miscommunication periods.

8. The method according to claim 1 comprising monitoring at least one of the remote control unit, and the drone to provide monitoring results; wherein the transmitting is responsive to the monitoring results.

9. A non-transitory computer readable medium for slowing or stopping a progress, towards a target, of a drone controlled by a remote control unit, the non-transitory computer readable medium stores instructions, the instructions comprising instructions for:
    transmitting, using a transmitter, disruption signals for introducing communication errors between the drone and the remote control unit by preventing a successful encoding of most but not all information units sent to the drone from the remote control unit, during multiple spaced apart miscommunication periods, without disconnecting the drone from the remote control unit, thereby inducing the drone to slow or stop a progress of the drone towards the target and without executing, by the drone, a failsafe plan.

10. The non-transitory computer readable medium according to claim 9 that stores instructions for determining a location of at least one of the drone and the remote control unit during the multiple spaced apart miscommunication periods and between the multiple spaced apart miscommunication periods.

11. The non-transitory computer readable medium according to claim 9 wherein the transmitting comprises transmitting the disruption signals during multiple spaced apart transmission periods, wherein disruption signals transmitted during at least two of the multiple spaced apart transmission periods differ from each other; wherein the multiple spaced apart transmission periods at least partially overlap at least two miscommunication periods of the multiple spaced apart miscommunication periods.

12. A non-transitory computer readable medium for slowing or stopping a progress, towards a target, of a drone controlled by a remote control unit, the non-transitory computer readable medium stores instructions the instructions comprising instructions for: transmitting, using a transmitter, disruption signals for introducing communication errors between the drone and the remote control unit, during multiple spaced apart miscommunication periods, without disconnecting the drone from the remote control unit, thereby inducing the drone to slow or stop a progress of the drone towards the target and without executing, by the drone, a failsafe plan; and monitoring responses of at least one of the drone and the remote control unit to a transmission of at least some of the disruption signals.

13. The non-transitory computer readable medium according to claim 12 that stores instructions for adapting the transmitting of the disruption signals based on the responses of the at least one of the drone and the remote control unit to the transmission of at least some of the disruption signals.

14. A non-transitory computer readable medium for slowing or stopping a progress, towards a target, of a drone controlled by a remote control unit, the non-transitory computer readable medium stores instructions the instructions comprising instructions for:

transmitting, using a transmitter, disruption signals for introducing communication errors between the drone and the remote control unit, during multiple spaced apart miscommunication periods, without disconnecting the drone from the remote control unit, thereby inducing the drone to slow or stop a progress of the drone towards the target and without executing, by the drone, a failsafe plan; and monitoring at least one of the remote control unit, and the drone to provide monitoring results; wherein the transmitting is responsive to the monitoring results.

15. A system for slowing or stopping a progress, towards a target, of a drone controlled by a remote control unit, the system comprising:

a transmitter that is configured to transmit disruption signals for introducing communication errors between the drone and the remote control unit, during multiple spaced apart miscommunication periods, without disconnecting the drone from the remote control unit, thereby inducing the drone to slow or stop a progress of the drone towards the target and without executing, by the drone, a failsafe plan;

wherein the disruption signals comprises disruption signals that are transmitted during multiple spaced apart transmission periods, wherein disruption signals transmitted during at least two of the multiple spaced apart transmission periods differ from each other; wherein the multiple spaced apart transmission periods at least partially overlap at least two miscommunication periods of the multiple spaced apart miscommunication periods.

* * * * *